(12) United States Patent
Kalasapur et al.

(10) Patent No.: US 8,156,118 B2
(45) Date of Patent: Apr. 10, 2012

(54) METHOD AND SYSTEM FOR GENERATING PLAYLISTS FOR CONTENT ITEMS

(75) Inventors: Swaroop Kalasapur, Sunnyvale, CA (US); Yu Song, Pleasanton, CA (US); Doreen Cheng, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 502 days.

(21) Appl. No.: 11/894,147

(22) Filed: Aug. 20, 2007

(65) Prior Publication Data
US 2009/0055426 A1 Feb. 26, 2009

(51) Int. Cl.
*G06F 17/30* (2006.01)
(52) U.S. Cl. .......................... 707/733; 707/913; 707/918
(58) Field of Classification Search ........... 707/999.001, 707/999.003, 999.01, 999.107, 733, 913, 707/918
See application file for complete search history.

(56) References Cited

U.S. PATENT DOCUMENTS

| | | | | |
|---|---|---|---|---|
| 5,616,876 A * | 4/1997 | Cluts | .............................. | 84/609 |
| 6,006,241 A * | 12/1999 | Purnaveja et al. | ............ | 715/205 |
| 6,446,080 B1 * | 9/2002 | Van Ryzin et al. | ......... | 707/104.1 |
| 6,526,411 B1 * | 2/2003 | Ward | ............................ | 707/102 |
| 6,748,395 B1 * | 6/2004 | Picker et al. | ................... | 707/102 |
| 6,880,132 B2 * | 4/2005 | Uemura | ......................... | 715/848 |
| 6,941,324 B2 * | 9/2005 | Plastina et al. | .............. | 707/104.1 |
| 7,003,737 B2 * | 2/2006 | Chiu et al. | ..................... | 715/848 |
| 7,111,009 B1 * | 9/2006 | Gupta et al. | ................... | 707/102 |
| 7,171,619 B1 * | 1/2007 | Bianco | ........................... | 715/206 |
| 7,277,852 B2 * | 10/2007 | Iyoku et al. | ..................... | 704/236 |
| 7,363,314 B2 * | 4/2008 | Picker et al. | ............ | 707/999.001 |
| 7,493,303 B2 * | 2/2009 | Newbold et al. | ................... | 707/2 |
| 7,590,656 B2 * | 9/2009 | Plastina et al. | .............. | 707/104.1 |
| 7,610,260 B2 * | 10/2009 | Asukai et al. | ...................... | 707/1 |
| 7,693,825 B2 * | 4/2010 | Wang et al. | ..................... | 707/713 |
| 2002/0032019 A1 * | 3/2002 | Marks et al. | ................... | 455/414 |
| 2004/0039934 A1 * | 2/2004 | Land et al. | ..................... | 713/200 |
| 2004/0237759 A1 * | 12/2004 | Bill | ................................ | 84/668 |
| 2005/0038819 A1 * | 2/2005 | Hicken et al. | .......... | 707/999.107 |
| 2006/0242661 A1 * | 10/2006 | Bodlaender et al. | .............. | 725/9 |
| 2007/0244870 A1 * | 10/2007 | Laurent et al. | .................... | 707/3 |
| 2010/0002082 A1 * | 1/2010 | Buehler et al. | ................. | 348/159 |

OTHER PUBLICATIONS

Mattias Jacobson et al., When Media Gets Wise: Collaborative Filtering With Mobile Media Agents, Jan. 29, 2006, ACM, pp. 291-293.*
Sasank Reddy et al.<Lifetrak: Music in Tune With Your Life, Oct. 27, 2006, ACM, pp. 291-293.*

* cited by examiner

*Primary Examiner* — Neveen Abel Jalil
*Assistant Examiner* — Jacques Veillard
(74) *Attorney, Agent, or Firm* — Beyer Law Group LLP

(57) ABSTRACT

A method and system for generating playlists for content items is provided. Generating a playlist involves monitoring user interaction with one or more content items as user-content interactions, determining a context associated with one or more user-content interactions, and generating a playlist of the content items based on the user-content interactions and the associated context.

42 Claims, 4 Drawing Sheets

METHOD AND SYSTEM FOR GENERATING PLAYLISTS FOR CONTENT ITEMS

FIELD OF THE INVENTION

The present invention relates to content management, and in particular to playlists for media content.

BACKGROUND OF THE INVENTION

With the proliferation of audio/visual (A/V) content for consumption via consumer electronics (CE) devices, consumers can benefit from playlists for access to such content. As such, in many conventional media players, users are given the option of manually creating their own playlists based on the available media collection. However, because often numerous content items are involved, the manual creation of playlists consumes large quantities of time, which may need to be repeated for updating such playlists.

In another conventional approach, a playlist is generated based on an observed play pattern of certain content items by a user, indicating user interest in the content items. Parameters that indicate interest are a play count for a content item over a time period and a skip count indicating that a user is skipping a particular content item. While the first parameter adds positively to the popularity of a particular content item and type, the second parameter has a negative effect on its popularity. However, such playlists are created without considering that a user may have interest in other types of content.

In another conventional approach, a system generates playlists based on the interests of similar users. It is assumed that if a user is similar to some other users, that user is likely to like content the other users like. However, this approach requires knowledge of other users, and collecting information about their preferences.

Yet in another conventional approach, the system generates playlists by comparing genre, artist and other characteristics for a content item, to that of other content items in order to find similar content. However, only playlists for similar content items are generated, and other content items that the user may have interest in are not determined and are not included in such playlists.

BRIEF SUMMARY OF THE INVENTION

The present invention provides a method and system for generating playlists for content items. In one embodiment, generating a playlist involves monitoring user interaction with one or more content items as user-content interactions, determining a context associated with one or more user-content interactions, and generating a playlist of the content items based on the user-content interactions and the associated context.

These and other features, aspects and advantages of the present invention will become understood with reference to the following description, appended claims and accompanying figures.

DETAILED DESCRIPTION OF THE INVENTION

The present invention provides a method and system for generating playlists for content items. Such content items may include A/V media items and other information. In one embodiment, a personalized playlist is generated based on certain parameters such as user context and associated user interactions in relation to media items (i.e., user-media interactions).

The user context may include current location, date/time and user activities. The associated user interactions may include operating a media player as in playing a media item, skipping a media item, replaying a media item, etc. Information about the user context is utilized in generating a personalized playlist based on monitored user interactions.

In one implementation, a monitoring module monitors (obtains) user context such as user activity, time/date, and the current location of the user by utilizing a location sensor (e.g., a global positioning system (GPS)), or querying the user, etc.

The monitoring module further monitors user interactions in relation to media items, and notes the associated user context. Information about user interaction is used along with the associated user context, to generate personalized playlists.

For example, when a user initially begins using a media player, the playlist is blank. Over a period of time, user interactions such as music playing habits are monitored to determine user preferences. The user context associated with each user interaction is also monitored. Personalized playlists are then generated based on the user preferences and the corresponding user context.

Figure 1:
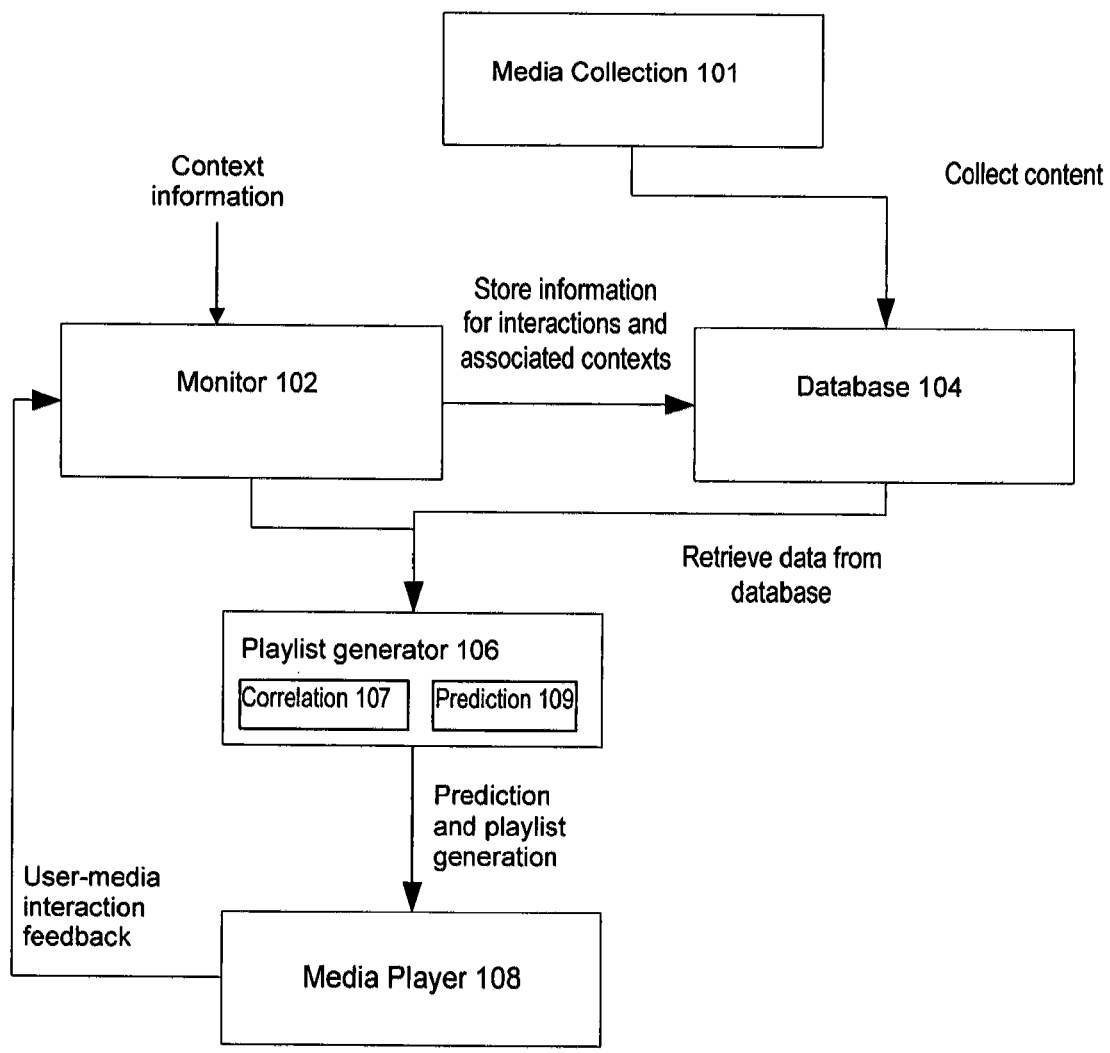
FIG. 1 shows a functional block diagram of a system for generating playlists for content items, according to an embodiment of the present invention.

FIG. 1 shows an example system for generating personalized playlists according to an embodiment of the present invention. The system 100 utilizes a media collection 101 including a collection of media items that a user can interact with (e.g., view, listen). The system 100 includes a monitor 102 that monitors user interactions and associated context as described, and can record information about the monitored interactions and context in a database 104.

The system 100 further includes a playlist generator 106 that uses information about the monitored interactions and context from the database 104, to predict user-interest scores for media items based on one or more current user contexts, and generate personalized playlists for the current context. A media player 108 provides a media playing application that plays media items in the personalized playlist as recommended media items for the user based on the current user context.

Multiple playlists can be generated based on user preferences at different locations, at different time periods and with different activities (e.g., working, walking, exercising, driving, etc.). Such playlists organize user media collections based on criteria such as genre, artist, language, etc., and retrieve media items (e.g., music, video grouped together based on user interactions and context (i.e., context-aware playlists).

Figure 2:
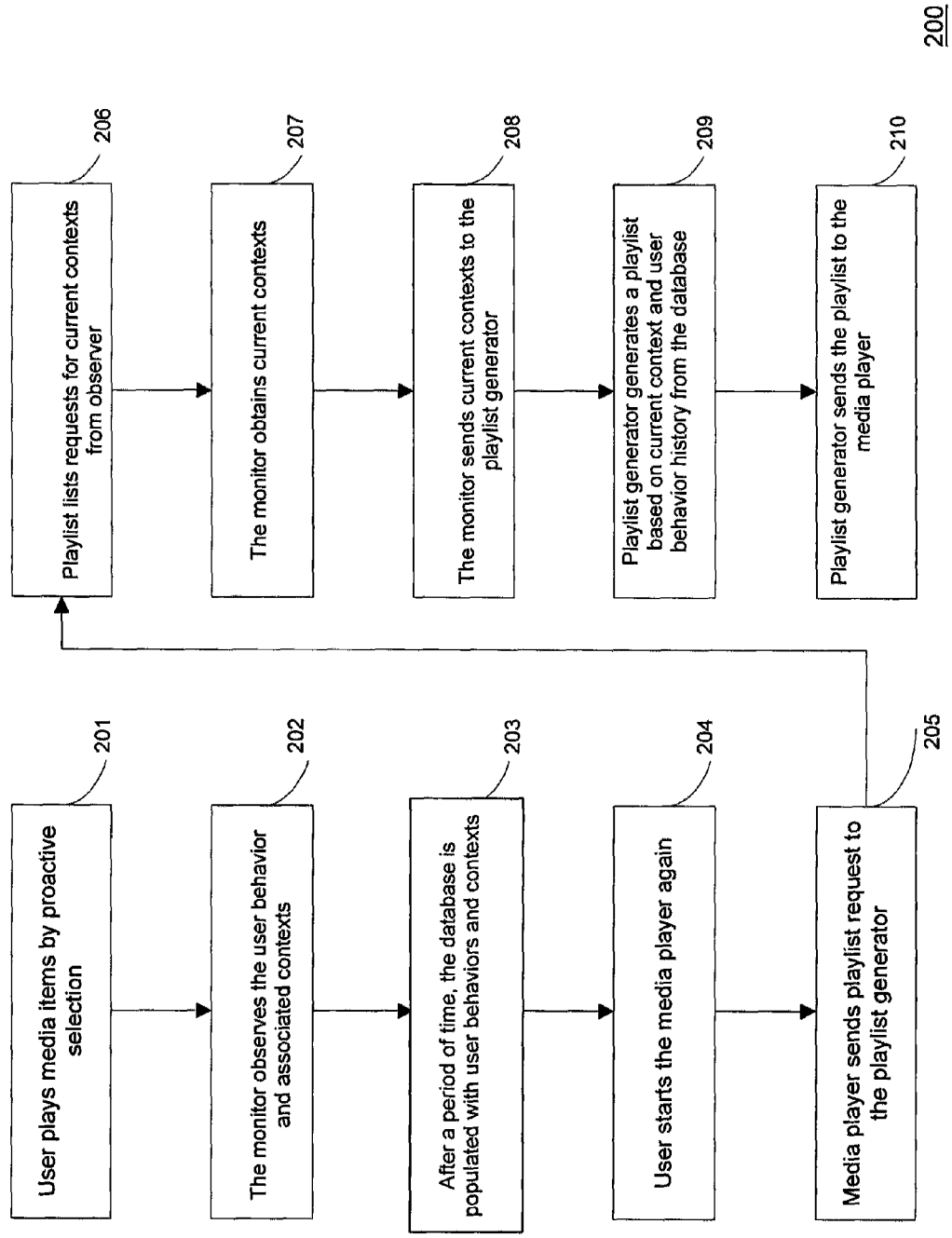
FIG. 2 shows a flowchart of a process for generating playlists, according to an embodiment of the present invention.

FIG. 2 shows a flowchart of the steps of a process 200 for generating a personalized playlist in the system 100 of FIG. 1, according to an embodiment of the present invention. The process 200 includes the following steps:

Step 201: Initially, a user uses the media player 108 to play media items from a media collection 101. Because the database 104 may initially be empty, the playlist generator 106 cannot generate a personalized playlist yet. As such, the user may proactively (manually) select media items from the media collection 101.

Step 202: The monitor 102 monitors (observes) the user behavior in interacting with the media player 108 in relation to each selected media item. For example, the monitor 102 monitors user access to media items by observing which media item is selected, whether it is played or skipped, and also monitors the corresponding (associated) contexts, such as time, location, user activity (e.g., working, exercising, etc.). The monitored information (observation results) is stored in the database 104.

Step 203: Over time, the database 104 is gradually populated with data representing user behavior in interacting with the media player 108 in relation to certain media items, and the corresponding context.

Step 204: At a later time, the user starts the media player 108.

Step 205: The media player 108 sends a request to the playlist generator 106 for a personalized playlist.

Step 206: The playlist generator 106 requests information about current context(s) from the monitor 102. In one example, the playlist generator 106 requests information about the current time, location and user activity from the monitor 102.

Step 207: The monitor 102 observes the current context(s), such as time, location, etc.

Step 208: One or more current contexts are provided to the playlist generator 106.

Step 209: The playlist generator 106 performs a recommendation process using the current context(s) and the monitored information stored in the database 104, to generate a set of recommended media items as a personalized playlist for the user.

Step 210: The playlist generator 106 sends the recommended items to the media player 108 for user access to the content items recommended by the playlist.

In one example, monitoring user-media interaction and associated context involves acquiring sufficient data on how the user interacts with each media item, by monitoring the following information every time the user interacts with a media item via the media player:

1. The type of interaction (e.g., playing, skipping, stopping in the middle, etc.).
2. The time(s) of interaction; the location(s) of interaction; the time zone(s) for the interaction.
3. The type of user activity (e.g., walking, driving, working, etc.) while interacting with the media element.
4. The number of times the media item has been interacted with in this way in this location, etc.

According to an implementation of the recommendation process in step 209 above, such monitored information is then analyzed. Scores for user-media interaction and associated context (e.g., location, time of day, current activity, etc.) is computed, for generating one or more personalized playlists, as described in further detail below.

Specifically, the user-media interactions and associated context in the database 104 are used to determine correlations between user preferences for different media items in different contexts, and to generate a set of recommended items as a personalized playlist for the user.

Figure 3:
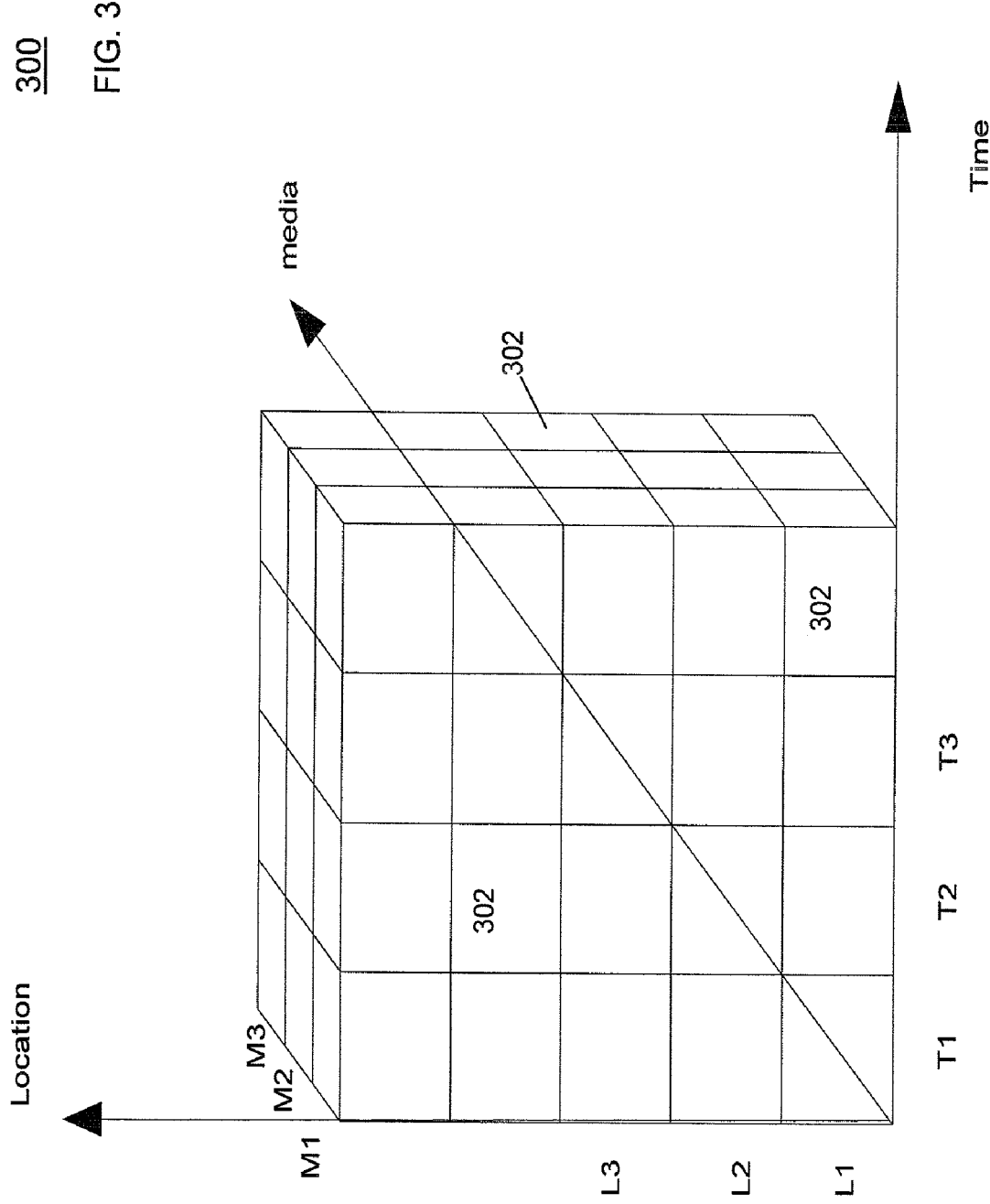
FIG. 3 shows a diagram of a data structure representing correlations between user-media interactions and associated context for generating playlists, according to an embodiment of the present invention.

In one implementation, information about user-media interaction and associated context is stored in the database 104 using a data structure that represents an n-dimensional matrix 300 of multiple cells 302 as shown in FIG. 3. A correlation module 107 (FIG. 1) uses the matrix 300 to capture correlations among media items and associated context information such as location, time, etc.

In one example, a first dimension in the matrix 300 includes information about available media (i.e., M1, M2, M3, . . . ). A second dimension includes information about location (e.g., L1, L2, L3, . . . ) of user-media interaction (e.g., home, office, car, etc.).

On a second dimension, a special location called "anywhere" is not associated with any particular physical location, and is used to capture user-media interaction when a user is moving, such as walking and driving. The number of dimensions is based on the contexts that a device can capture. For example, if a device is equipped with a GPS, then location is a dimension in addition to time. If a device is additionally equipped with an accelerometer, then speed is an additional dimension.

A third dimension includes information about the time (e.g., T1, T2, T3, . . . ) of a user-media interaction (e.g., "weekday morning", "weekday noon", "weekday afternoon", "weekday evening", weekday night", etc.). There are also corresponding weekend and holiday entries on this dimension. Remaining dimensions include information about user activities, such as driving, walking, working, running, etc.

Each cell 302 in the n-dimensional matrix 300 includes a normalized numeric score (e.g., from 0 to 1). The scores in the cells are determined by the correlation module 107 based on monitored user-media interactions and context (i.e., user history). The score in each cell is based on information from each dimension at that particular cell. If a dimension has monitored (observed) information, then the monitored information represents an observed score for the cell.

If a dimension does not have monitored information, then the cell does not have an observed score, and a prediction module 109 (FIG. 1) predicts a score for the cell using said correlations among media items and related context based on the matrix 300. As such, the score at each cell represents either the observed (actual) user interest in a media item in a particular context, or a predicted user interest in a media item in a particular context (e.g., performing an activity at a particular location at a particular time).

In one example implementation, the following heuristics are used for a score prediction: a user is likely to prefer the same media in the current context (e.g., location, time activities) as the user preferred in similar contexts. For example, if a user prefers light rock songs while driving from home to work, the user is likely to prefer similar songs when driving back from work to home.

A set of similar contexts are identified by similarity computation of scores of media items that have been accessed in such contexts. An example of such similarity computation can be a cosine-based or a Pearson-based similarity computation. Once the similarity between one context and other contexts is performed, then the top N similar contexts are selected to predict a score for a cell involving a media item in the current context, using relation (1) below:

$$S_{c,m} = \overline{S}_m + \frac{\sum_{i}^{N} Sim(c, c_i)(S_{c_i,m} - \overline{S}_m)}{\sum_{i}^{N} Sim(c, c_i)} \quad (1)$$

wherein $S_{c,m}$ represents the predicted score for the media item m in context c, and $S_m$ represents the average score of the media item m in the top N similar contexts, and $Sim(c, c_i)$ represents the similarity between the context c and the context $c_i$. $\overline{S}_m$ is the average score of a media item m under all contexts where there are valid scores. In the matrix, this can be visualized as the average of all scores for the particular media m.

Preferably, the predicted score is used to adjust scores for all media items in the current context. For example, the score for a media item is increased by some factor if the user in the past has completed the playback of the media item in similar contexts. The score for a media item is decreased if the user has in the past skipped the media item in a similar context.

In addition, the scores in the cells can be adjusted by an inverse aging function such that if a media item has not been played back recently, its score is increased while a recent playback decreases its score. For example, the score of a song can be calculated based on an initial preference score of 3 in the range of 1-5, and when the user skips the song, the score is lowered by 0.1, but if it is played entirely, its score is increased by 0.1. If the song is played frequently, its score is increased by 0.2, and so on. After such an adjustment, a list of the media items is sorted by their scores to generate a playlist of top M media items based on their scores.

In another example implementation, the following heuristics are used for score prediction: a user is likely to prefer media items in the current context that are similar to media items the user prefers in other contexts. For example, if a user prefers light rock music when driving or working, the user is likely to prefer such media when walking.

In this case, a media similarity between different contexts is determined. The similarity computation determines similarity between media items that a user has interacted with in multiple contexts. An example of such similarity computation can be a cosine-based or a Pearson-based similarity computation. Based on the similarity computation between two media items, a score can be predicted for a media item in a current context using relation (2) below:

$$S_{c,m} = \frac{\sum_{i}^{N} Sim(m, m_i)(S_{c_i,mi})}{\sum_{i}^{N} Sim(m, m_i)} \quad (2)$$

wherein $S_{c,m}$ represents the predicated score for a media item m in a context c, and $S_{c,mi}$ represents the score a media item media $m_i$ in a current context, and $Sim(m, m_i)$ represents the similarity between the media items m and $m_i$.

Preferably, the predicted score is used to adjust the scores for all media items in the current context. For example, the media item scores are increased by some factor if the user in the past has completed the playback of the media item. The score is decreased if the user has skipped the media item in the past.

In addition, the scores can be adjusted by an inverse aging function such that if the media item has not been played back recently, the score is increased while recent playback decreases the score. After the adjustment, a list of media items is sorted based on scores, and a playlist of top M media item based on their scores is generated. Other examples of generating the playlist according to the teachings of the present invention are possible.

Further, the scores from the above two example implementations of score prediction can be combined to generate a final predicted score for the cells. Though, in the examples described above an n-dimensional matrix model is used to capture essential correlations among media items and related context information, similar personalized playlists can be generated by employing alternate models that capture the correlations. An example of such an alternative model can be a dynamic graph that keeps track of the correlation between each media item and various contexts that are of relevance.

The playlists can further be based on additional or other relevant context information such as: a personal calendar, user mood which may be acquired automatically using sensors or upon consultation with the user, etc. Further, instead of, or in addition to, initial user proactive personalization of a playlist, an initial score for media items can be generated using metadata for media items such as artist, genre, etc. Such initial scores can then be combined with the predicted scores to generate final scores in the playlist generator.

Figure 4:
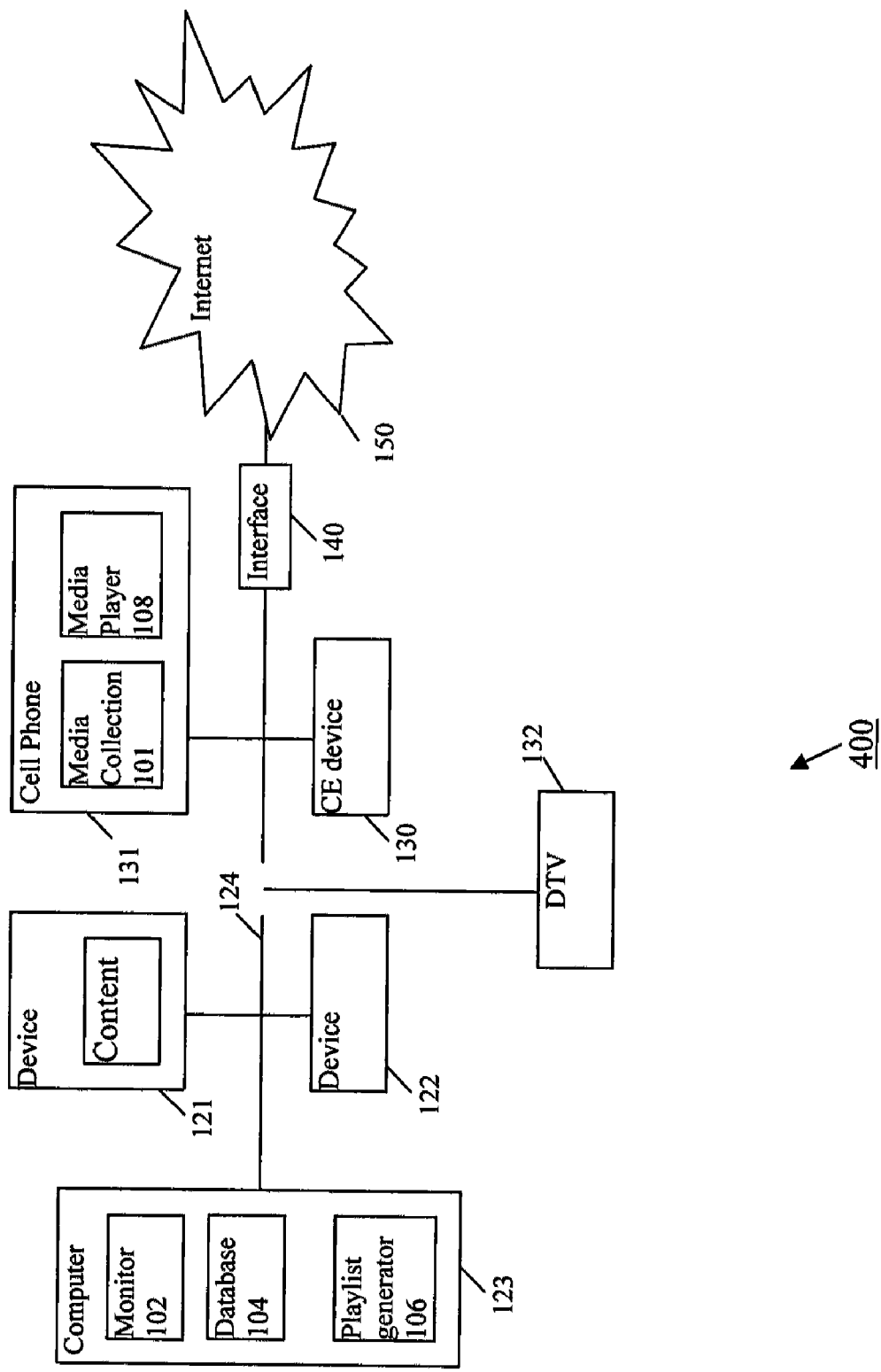
FIG. 4 shows a functional block diagram of a local area network implementing an embodiment of the present invention.

In one implementation, the components 101 to 108 (FIG. 1) are software modules that can reside on a single device or multiple devices. For example, a personal computer (PC) can contain all of the components. Another example shown in FIG. 4, illustrates an implementation in a local area network (LAN) such as a home network 400. The network 400 comprises electronic devices 121, 122 (e.g., appliances) which may include content, a personal computer (PC) 123, CE devices 130, 131, 132 which may include content and an interface 140 that connects the network 400 to an external network 150 (e.g., data sources, the Internet). One or more devices can implement the Universal Plug and Play (UPnP) protocol for communication therebetween. Other network communication protocols (e.g., Jini, HAVi, IEEE 1394) can also be used. Further, the network 400 can be a wireless network, a wired network, or a combination of the two.

In the example shown in FIG. 4, a CE device such as the cell phone 131 includes the media collection 101 and the media player 108, while the PC 123 implements the monitor 102, the database 104 and the playlist generator 106. The PC 123 and the cell phone 131 can communicate via the network medium 124.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of generating a playlist for content items on a portable electronic device, comprising:
   at a first time, when a user operates the portable electronic device to interact with content:
      monitoring user interaction with one or more content items as user-content interactions;
      determining a context associated with each of the user-content interactions, wherein the context further comprises a time of a corresponding user-content interaction and a location of the corresponding user-content interaction;

storing the monitored user-content interactions and the context associated with the monitored user-content interactions;

at a second time, later than the first time:

determining a first current context associated with the user-content interactions, wherein the first current context further comprises a time of the user-content interaction and a location of the user-content interaction;

determining correlations of the time of the user-content interactions, the location of the user-content interactions, and the content items;

providing a multi-dimensional matrix to capture the correlations of the time of the user-content interactions, the location of the user-content interactions, and the content items:

predicting a numeric score for each cell of the multi-dimensional matrix;

applying an inverse aging function to the numeric scores; and automatically generating a first recommended playlist including content items, wherein the first recommended playlist is based on the first current context by locating first stored user-content interactions having corresponding stored contexts that are most similar to the first current context, and using the located first stored user-content interactions to compile the first recommended playlist;

at a third time, later than the second time:

determining a second current context based on current time and user location; and automatically generating a second recommended playlist including content items, wherein the second recommended playlist is based on the second current context by locating second stored user-content interactions having corresponding stored contexts that are most similar to the second current context, and using the located second stored user-content interactions to compile the second recommended playlist, wherein the second recommended playlist differs from the first recommended playlist due to the second current context being different than the second current context.

2. The method of claim 1 wherein generating a playlist further comprises determining correlations of the time of the user-content interactions, the location of the user-content interactions, and the content items.

3. The method of claim 2 wherein determining a context associated with each interaction further includes determining one or more of: user location, user activity, date and time.

4. The method of claim 2 wherein generating a playlist further includes determining user preferences for content items based on user-content interactions and associated context.

5. The method of claim 4 further comprising generating a list of recommended content items based on the user preferences for content items based on user-content interactions and associated context.

6. The method of claim 4 wherein generating a playlist further includes further comprising determining user preferences for content items in various contexts based on monitored user-content interactions and associated context.

7. The method of claim 4 wherein generating a playlist further includes determining correlations among content items and various context, based on monitored user-content interactions and associated context.

8. The method of claim 7 further comprising predicting user preferences for content items in various contexts based on the correlations.

9. The method of claim 4 wherein generating a playlist further includes determining user preferences for content items based on heuristics that a user is likely to prefer the same content items in a current context as the user prefers in similar contexts.

10. The method of claim 4 wherein generating a playlist further includes determining user preferences for content items based on heuristics that a user is likely to prefer the same content items in similar contexts.

11. The method of claim 4 wherein generating a playlist further includes determining user preferences for content items based on heuristics that a user is likely to prefer content items in a current context that are similar to content items the user prefers in other contexts.

12. The method of claim 2 further comprising providing a multi-dimensional matrix to capture the correlations of the time of the user-content interactions, the location of the user-content interactions, and the content items.

13. The method of claim 12 further comprising determining numeric scores for each cell of the multi-dimensional matrix.

14. The method of claim 13, wherein determining the numeric scores is based on the monitored user interactions.

15. The method of claim 13, wherein determining the numeric scores further comprises predicting scores based on a similarity computation.

16. The method of claim 1, wherein the context further comprises user activities.

17. The method of claim 1, wherein the recommended playlist is automatically generated based on user preferences at a plurality of different locations.

18. The method of claim 17, wherein the recommended playlist is automatically generated based on user preferences at a plurality of different times of day.

19. An apparatus for generating a playlist for content items on a portable electronic device, comprising:

a monitoring device configured for, at a first time, monitoring user interaction with one or more content items as user-content interactions, storing the monitored user-content interactions and the context associated with the monitored user-content interactions, and for, at a second time, determining a first current context associated with the user-content interactions, wherein the first current context further comprises a time of the user-content interaction and a location of the user-content interaction, determining correlations of the time of the user-content interactions, the location of the user-content interactions, and the content items, providing a multi-dimensional matrix to capture the correlations of the time of the user-content interactions, the location of the user-content interactions, and the content items; predicting a numeric score for each cell of the multi-dimensional matrix; applying an inverse aging function to the numeric scores; and a playlist generating device configured for automatically generating a recommended playlist including content items, wherein the recommended playlist is based on the current context by locating stored user-content interactions having corresponding stored contexts that are most similar to the current context, and using the located stored used-content interactions to compile the recommended playlist.

20. The apparatus of claim 19 wherein the monitoring device is further configured for monitoring user interaction with a content player in accessing one or more content items, wherein the playlist generating device is configured for generating a playlist by determining correlations of the time of the user-content interactions, the location of the user-content interactions, and the content item.

21. The apparatus of claim 20 wherein the monitoring device is further configured for determining a context associated with each interaction by determining one or more of: user location, user activity, date and time.

22. The apparatus of claim 20 wherein the playlist generating device is further configured for determining user preferences for content items based on user-content interactions and associated context.

23. The apparatus of claim 22 further comprising a correlation module device configured for determining user preferences for content items in various contexts based on monitored user-content interactions and associated context.

24. The apparatus of claim 22 further comprising a correlation module device configured for determining correlations among content items and various context, based on monitored user-content interactions and associated context.

25. The apparatus of claim 24 further comprising a prediction module device configured for predicting user preferences for content items in various contexts based on the correlations.

26. The apparatus of claim 22 wherein the playlist generating device is further configured for generating a list of recommended content items based on the user preferences for content items based on user-content interactions and associated context.

27. The apparatus of claim 22 wherein the playlist generating device is further configured for generating a playlist by determining user preferences for content items based on heuristics that a user is likely to prefer the same content items in a current context as the user prefers in similar contexts.

28. The apparatus of claim 22 wherein the playlist generating device is further configured for generating a playlist by determining user preferences for content items based on heuristics that a user is likely to prefer the same content items in similar contexts.

29. The apparatus of claim 22 wherein the playlist generating device is further configured for generating a playlist by determining user preferences for content items based on heuristics that a user is likely to prefer content items in a current context that are similar to content items the user prefers in other contexts.

30. A system for generating a playlist for content items, comprising:
 a monitoring device configured for, at a first time, monitoring user interaction with one or more content items as user-content interactions, storing the monitored user-content interactions and the context associated with the monitored user-content interactions, and for, at a second time, determining a first current context associated with the user-content interactions, wherein the first current context further comprises a time of the user-content interaction and a location of the user-content interaction, determining correlations of the time of the user-content interactions, the location of the user-content interactions, and the content items, providing a multi-dimensional matrix to capture the correlations of the time of the user-content interactions, the location of the user-content interactions, and the content items; predicting a numeric score for each cell of the multi-dimensional matrix; applying an inverse aging function to the numeric scores;
 a data structure configured for storing the monitored information to capture correlations among content items and associated context information; and
 a playlist generating device-configured for automatically generating a recommended playlist including content items based on the current context and stored monitored information in the data structure.

31. The system of claim 30 further including a content player device such that the monitor is further configured for monitoring user interaction with the content player in accessing one or more content items, wherein the playlist generating device is configured for generating a playlist by determining correlations of the time of the user-content interactions, the location of the user-content interactions, and the content item.

32. The system of claim 31 wherein the monitoring device is further configured for determining a context associated with each interaction by determining one or more of: user location, user activity, date and time.

33. The system of claim 31 wherein the playlist generating device is further configured for determining user preferences for content items based on user-content interactions and associated context.

34. The system of claim 33 wherein the playlist generating device includes a correlation module configured for determining user preferences for content items in various contexts based on monitored user-content interactions and associated context.

35. The system of claim 33 wherein the playlist generating device includes a correlation module configured for determining correlations among content items and various context, based on monitored user-content interactions and associated context.

36. The system of claim 35 wherein the playlist generating device includes a prediction module configured for predicting user preferences for content items in various contexts based on the correlations.

37. The system of claim 33 wherein the playlist generating device is further configured for generating a list of recommended content items based on the user preferences for content items based on user-content interactions and associated context.

38. The system of claim 33 wherein the playlist generating device is further configured for generating a playlist by determining user preferences for content items based on heuristics that a user is likely to prefer the same content items in a current context as the user prefers in similar contexts.

39. The system of claim 33 wherein the playlist generating device is further configured for generating a playlist by determining user preferences for content items based on heuristics that a user is likely to prefer the same content items in similar contexts.

40. The system of claim 33 wherein the playlist generating device is further configured for generating a playlist by determining user preferences for content items based on heuristics that a user is likely to prefer content items in a current context that are similar to content items the user prefers in other contexts.

41. The system of claim 30 further comprising a content collection module configured for maintaining content items.

42. The system of claim 30 wherein the content items include audio/visual information.

* * * * *